(12) United States Patent
Rutledge

(10) Patent No.: US 10,934,949 B2
(45) Date of Patent: Mar. 2, 2021

(54) COMBINED ENGINE SYSTEMS

(71) Applicant: Caterpillar Inc., Deerfield, IL (US)

(72) Inventor: John Rutledge, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/353,587

(22) Filed: Mar. 14, 2019

(65) Prior Publication Data

US 2019/0323438 A1 Oct. 24, 2019

(51) Int. Cl.
| | | |
|---|---|---|
| H02P 9/04 | (2006.01) |
| F02D 25/00 | (2006.01) |
| F01N 13/00 | (2010.01) |
| F02D 29/06 | (2006.01) |
| F01P 7/14 | (2006.01) |
| H02K 7/18 | (2006.01) |
| F02G 5/02 | (2006.01) |
| H02K 11/00 | (2016.01) |
| H02K 7/02 | (2006.01) |
| F02B 73/00 | (2006.01) |

(52) U.S. Cl.
CPC ............ *F02D 25/00* (2013.01); *F01N 13/002* (2013.01); *F01P 7/14* (2013.01); *F02B 73/00* (2013.01); *F02D 29/06* (2013.01); *F02G 5/02* (2013.01); *H02K 7/025* (2013.01); *H02K 7/1815* (2013.01); *H02K 11/0094* (2013.01)

(58) Field of Classification Search
CPC .. F02D 25/00; F02D 25/04; F01P 7/14; F02B 73/00
See application file for complete search history.

(56) References Cited

U.S. PATENT DOCUMENTS

| 4,424,775 A | * | 1/1984 | Mayfield, Jr. | .......... | F01M 5/001 123/142.5 R |
| 4,759,181 A | | 7/1988 | Biritz | | |
| 5,947,064 A | | 9/1999 | Lauritsen | | |

(Continued)

FOREIGN PATENT DOCUMENTS

| DE | 102014005515 A1 | 10/2015 |
| JP | 06270796 A | 9/1994 |

(Continued)

OTHER PUBLICATIONS

Search Report for related United Kingdom Application No. 1806336.2; report dated Sep. 26, 2018.

*Primary Examiner* — Tulsidas C Patel
*Assistant Examiner* — Thomas K Quigley

(57) ABSTRACT

A combined engine system is disclosed which may help to meet electrical power demand of a common load that can vary in an unpredictable manner. The system comprises at least one primary engine and one or more secondary engines. An after-treatment system is connected to the engines to receive exhaust flow from each of the engines. A controller is configured to operate the system in a first operating mode when only the primary engine is running and a second operating mode when the secondary engines are run together with the primary engine. Exhaust flows from each of the engines are passed through the after-treatment system which allows the after-treatment system to be heated by the exhaust flow of the primary engine before receiving exhaust flows from the secondary engines.

16 Claims, 7 Drawing Sheets

(56) References Cited

U.S. PATENT DOCUMENTS

| | | | |
|---|---|---|---|
| 6,470,844 B2* | 10/2002 | Biess | F01M 5/021 |
| | | | 123/142.5 R |
| 7,266,943 B2 | 9/2007 | Kammel | |
| 7,614,381 B2* | 11/2009 | Hoff | F01M 5/02 |
| | | | 123/196 R |
| 7,624,569 B2 | 12/2009 | Driscoll et al. | |
| 7,769,537 B2* | 8/2010 | Gates | F02N 19/04 |
| | | | 123/142.5 E |
| 8,596,201 B2* | 12/2013 | Kral | B61C 17/04 |
| | | | 105/62.1 |
| 9,272,241 B2 | 3/2016 | Königsson | |
| 10,107,175 B1* | 10/2018 | Bowler | F01P 3/20 |
| 2004/0144080 A1* | 7/2004 | Suzuki | F02D 41/1441 |
| | | | 60/276 |
| 2010/0170414 A1* | 7/2010 | Hardin | B61C 17/04 |
| | | | 105/35 |
| 2010/0286861 A1* | 11/2010 | Mackin | B60L 53/00 |
| | | | 701/31.4 |
| 2013/0291826 A1* | 11/2013 | McAlister | F02B 19/00 |
| | | | 123/254 |
| 2016/0237882 A1* | 8/2016 | Ge | F02B 37/004 |
| 2017/0067370 A1* | 3/2017 | Seo | F02M 31/042 |
| 2019/0323438 A1* | 10/2019 | Rutledge | F02D 29/06 |

FOREIGN PATENT DOCUMENTS

| | | |
|---|---|---|
| JP | 2006077715 A | 3/2006 |
| KR | 101335308 B1 | 12/2013 |

\* cited by examiner

# COMBINED ENGINE SYSTEMS

TECHNICAL FIELD

The present disclosure relates to combined engine systems. For example, the present disclosure relates to systems that have multiple engine installations.

BACKGROUND

Combined engine systems can be used to provide electrical power. A combined engine system is a system where multiple engine installations are connected to a common load. It can be desirable to use a combined engine system in a situation where the electrical power demand of a load can vary in an unpredictable manner. An example is a petroleum drilling rig. Electrical power is provided to rotate a drilling bit of the petroleum drilling rig. The electrical power required will vary depending on the resistance encountered by the drilling bit. This can vary unpredictably dependent on the drilling conditions.

An example of a prior art combined engine system is shown in FIG. 1. The combined engine system comprises a first engine installation 1a, a second engine installation 1b and a third engine installation 1c. Each of the engine installations 1a-c comprises an engine 6a-c in the form of an internal combustion engine. In the example of FIG. 1 the engines 6a-c are diesel engines. Each engine installation 1a-c also comprises a generator connected to a respective drive output of the engine 6a-c. The generators are connected electrically to a common load 10. The common load 10 is common to all of the engine installations 1a-c as the power demanded by the load 10 is supplied by the combined electrical output of the three engine installations 1a-c.

Each engine installation 1a-c also comprises a separate cooling system 7a-c in which a coolant fluid is circulated around a respective cooling circuit comprising the engine 6a-c and a radiator.

Each engine installation 1a-c also comprises a separate after-treatment unit. An exhaust outlet of each engine 6a-c is connected to an after-treatment unit 5a-c by an exhaust conduit 4a-c. Each after-treatment unit 5a-c comprises a diesel oxidation catalyst (DOC), a diesel particulate filter (DPF) and a selective catalytic reduction catalyst (SCR).

In use, the combined engine system of FIG. 1 operates as follows. All of the engines 6a-c run simultaneously. When the power demanded by the common load 10 is low each engine 6a-c operates at a low load, where load can be regarded as $$\frac{\text{actual engine output torque}}{\text{maximum engine output torque at current engine speed}}$$

When the power demanded by the common load 10 increases each engine 6a-c increases its load to meet the increased demand.

While each engine 6a-c is running, an exhaust flow from each engine 6a-c passes through each respective exhaust conduit 4a-c and then through each respective after-treatment unit 5a-c.

While each engine 6a-c is running, the engine temperature is controlled by its respective cooling system 7a-c.

The operational characteristics of the combined engine system of FIG. 1 are shown in FIGS. 2 to 5. FIGS. 2 to 5 show idealised data to better illustrate the principals of operation.

FIG. 2 shows the total load of the combined engine system against time. Initially the total load is at 25%. At time=30 s the total load is increased at an even rate over a 10 s transition period to reach 70% at time=40 s.

FIG. 3 shows the load of each of the engines 6a-c against time. Initially the total load of 25% is met by each engine 6a-c operating at 25% load. At time=30 s the load of each engine 6a-c is increased at an even rate over a 10 s transition period to reach 70% at time=40 s.

FIG. 4 shows the engine coolant temperature of each engine 6a-c against time. Since all of the engines 6a-c run throughout operation of the combined engine system and start within the temperature control range of their thermostats the temperature of each engine 6a-c is maintained at around 93° C.

FIG. 5 shows engine normalised efficiency against time for each engine 6a-c, where normalised efficiency can be regarded as current engine efficiency divided by best engine efficiency. Engine efficiency may be defined as the net or brake useful work done by the engine divided by the energy of the fuel consumed by the engine in doing that work. Initially each of the engines 6a-c has a normalised efficiency of around 44% and the composite normalised efficiency of the combined engine system is therefore also around 44%. At 40 s, after the transition period, the normalised efficiency of each engine has increased to around 81% and the composite normalised efficiency of the combined engine system has also increased to around 81%.

While the combined engine system of FIG. 1 provides a system to meet electrical power demand of a load that can vary in an unpredictable manner, it would be desirable to provide an improved system.

SUMMARY

Against this background there is provided in a first aspect of the present disclosure a combined engine system comprising:

a plurality of engines including at least one primary engine and one or more secondary engines, wherein an output from each of the plurality of engines is connectable to a common load;

an after-treatment system connected to the plurality of engines to receive exhaust flow from each of the plurality of engines; and a controller;

the controller being configured to operate the combined engine system in a first operating mode to meet a first load demand of the common load and a second operating mode to meet a second load demand of the common load which is greater that the first load demand;

in the first operating mode the controller is configured to run the at least one primary engine and not run the one or more secondary engines such that a primary exhaust flow of the at least one primary engine passes through the after-treatment system;

in the second operating mode the controller is configured to run at least one of the one or more secondary engines at the same time as the at least one primary engine such that the primary exhaust flow of the at least one primary engine and a secondary exhaust flow of the one or more secondary engines passes through said after-treatment system.

In a second aspect of the present disclosure, there is provided a method of operating a combined engine system of the type comprising a plurality of engines including at least one primary engine and one or more secondary engines, the method comprising the steps of:
  connecting an output from each of the plurality of engines to a common load;
  connecting an exhaust outlet of each of the plurality of engines to an after-treatment system;
  using a controller to operate the combined engine system in a first operating mode to meet a first load demand of the common load and a second operating mode to meet a second load demand of the common load which is greater that the first load demand;
  wherein in the first operating mode the controller runs the at least one primary engine and does not run the one or more secondary engines such that a primary exhaust flow of the at least one primary engine passes through the after-treatment system;
  in the second operating mode the controller runs at least one of the one or more secondary engines at the same time as the at least one primary engine such that the primary exhaust flow of the at least one primary engine and a secondary exhaust flow of the one or more secondary engines passes through said after-treatment system.

In a third aspect of the present disclosure, there is provided a combined engine system comprising:
  a plurality of engines including at least one primary engine and one or more secondary engines, wherein an output from each of the plurality of engines is connectable to a common load;
  a cooling system connected to the plurality of engines, the cooling system comprising a common body of coolant fluid; and
  a controller;
  the controller being configured to operate the combined engine system in a first operating mode to meet a first load demand of the common load and a second operating mode to meet a second load demand of the common load which is greater that the first load demand;
  in the first operating mode the controller is configured to run the at least one primary engine and not run the one or more secondary engines;
  in the second operating mode the controller is configured to run at least one of the one or more secondary engines at the same time as the at least one primary engine;
  the controller being further configured to circulate the coolant fluid through the at least one primary engine when the at least one primary engine is running and the one or more secondary engines when the one or more secondary engines are running.

In a fourth aspect of the present disclosure, there is provided a method of operating a combined engine system of the type comprising a plurality of engines including at least one primary engine and one or more secondary engines, the method comprising the steps of:
  connecting an output from each of the plurality of engines to a common load;
  connecting a cooling system to the plurality of engines, the cooling system comprising a common body of coolant fluid;
  using a controller to operate the combined engine system in a first operating mode to meet a first load demand of the common load and a second operating mode to meet a second load demand of the common load which is greater that the first load demand;
  wherein in the first operating mode the controller runs the at least one primary engine and does not run the one or more secondary engines;
  in the second operating mode the controller runs at least one of the one or more secondary engines at the same time as the at least one primary engine;
  the method further comprising using the controller to circulate the coolant fluid through the at least one primary engine when the at least one primary engine is running and the one or more secondary engines when the one or more secondary engines are running.

DRAWINGS

Some aspects of the present disclosure shall be described, by way of example only, with reference to the following drawings, in which.

DETAILED DESCRIPTION

The present disclosure relates to combined engine systems. For example, the present disclosure relates to systems that have multiple engine installations.

Figure 6:
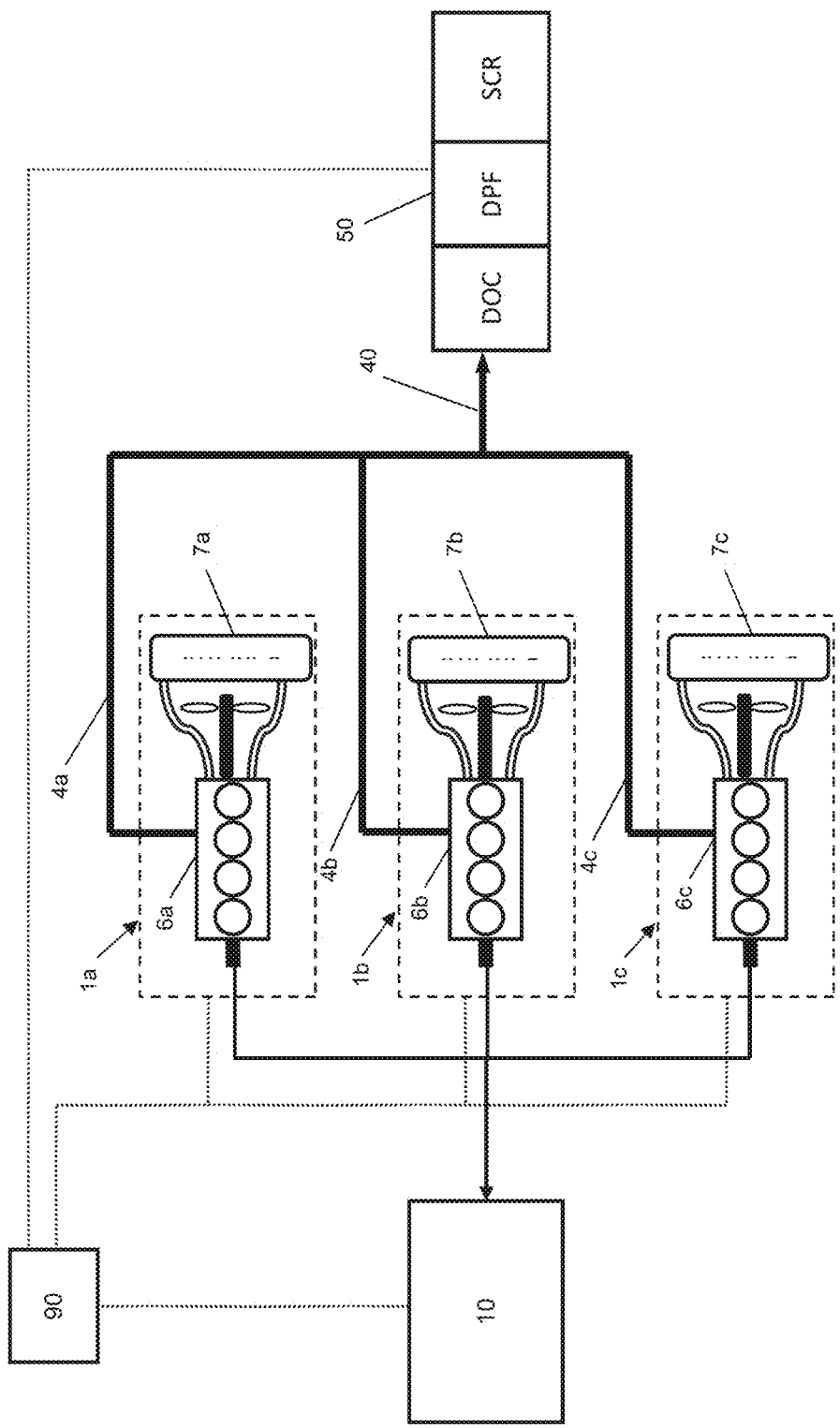
FIG. 6 shows a schematic representation of a first example of a combined engine system according to the present disclosure.

A first example of a combined engine system according to the present disclosure is shown schematically in FIG. 6. The combined engine system comprises a plurality of engines including at least one primary engine and one or more secondary engines.

The combined engine system may comprise a plurality of engine installations. There may be two, three or more than three engine installations. In the example of FIG. 6, three engine installations 1a-c are provided—a first engine installation 1a, a second engine installation 1b and a third engine installation 1c.

The engine installations 1a-c may be located at one location. The engine installations 1a-c may comprise a common housing. Alternatively, the engine installations 1a-c may be spatially distributed in different physical locations.

Each engine installation 1a-c may comprise an engine 6a-c, a generator and a cooling system 7a-c.

Each engine 6a-c may be an internal combustion engine. Each internal combustion engine may be a spark ignition engine or a compression ignition engine. For example, each internal combustion engine may be a diesel engine.

In the example of FIG. 6, the first engine installation 1a comprises a first engine 6a, the second engine installation 1b comprises a second engine 6b and the third engine installation 1c comprises a third engine 6c. The first engine 6a may be the primary engine of the combined engine system. The second engine 6b and the third engine 6c may be the secondary engines of the combined engine system.

Each generator may be connected to a drive output of the respective engine 6a-c. The generators may be connected electrically to a common load 10. The common load 10 may be common to all of the engine installations 1a-c as the power demanded by the common load 10 may be supplied by the combined electrical output of the three engine installations 1a-c.

Each cooling system 7a-c may comprise a cooling circuit for circulating a coolant fluid through the respective engine 6a-c and a radiator. In the example of FIG. 6 a separate cooling system 7a-c is provided as part of each engine installation 1a-c.

The combined engine system is provided with an after-treatment system 50 which is connected to the plurality of engines 6a-c to receive exhaust flow from each of the plurality of engines 6a-c. The after-treatment system 50 may therefore be a single after-treatment system that is common to all of the engines 6a-c as the exhaust flows from all of the three engines 6a-c may be treated by the single after-treatment system. In this way, the combined engine system may utilise only a single after-treatment system 50 that treats all exhaust flows of the combined engine system.

The after-treatment system 50 may comprise a single unit or may be composed of a plurality of sub-units that are operatively connected.

The after-treatment system 50 may comprise one or more of a diesel oxidation catalyst (DOC), a diesel particulate filter (DPF), a selective catalytic reduction catalyst (SCR), and another after-treatment component or components that would be familiar to anyone skilled in the art. The after-treatment system 50 may be located at the same location as the engines 6a-c. Alternatively, the after-treatment system 50 may be spatially separate from the engines 6a-c but fluidly connected to the engines 6a-c.

An exhaust outlet of each engine 6a-c may be fluidly connected to an inlet of the after-treatment system 50. In this way, an exhaust flow from all engines 6a-c may be passed through the same after-treatment system 50.

The exhaust flows from the engines 6a-c may be mixed at or prior to reaching the after-treatment system 50.

Each engine 6a-c may comprise a separate fluid connection to the after-treatment system. Alternatively, the fluid connections may comprise at least one portion of exhaust conduit that is common to at least two engines 6a-c.

In the example of FIG. 6, an exhaust conduit may extend from the first engine 6a to the after-treatment system 50. Said exhaust conduit may comprise a first exhaust conduit 4a and a common exhaust conduit 40. The first exhaust conduit 4a may be connected to the exhaust outlet of the first engine 6a at one end and connected to the common exhaust conduit 40 at its other end.

Further, an exhaust conduit may extend from the second engine 6b to the after-treatment system 50. Said exhaust conduit may comprise a second exhaust conduit 4b and the common exhaust conduit 40. The second exhaust conduit 4b may be connected to the exhaust outlet of the second engine 6b at one end and connected to the common exhaust conduit 40 at its other end.

Further, an exhaust conduit may extend from the third engine 6c to the after-treatment system 50. Said exhaust conduit may comprise a third exhaust conduit 4c and the common exhaust conduit 40. The third exhaust conduit 4c may be connected to the exhaust outlet of the third engine 6c at one end and connected to the common exhaust conduit 40 at its other end.

The common exhaust conduit 40 may be connected to the inlet of the after-treatment system 50.

The combined engine system further comprises a controller 90. The controller 90 may be operatively connected to the engine installations 1a-c, engines 6a-c and after-treatment system 50 to receive data signals and send control signals. Further, the controller 90 may be operatively connected to the common load 10 to receive load signals therefrom.

The controller 90 may receive from the after-treatment system 50 data signals indicative of one or more of: DOC temperature, DPF temperature, SCR temperature, DPF loading, backpressure, flow rate, concentration of gases ($NO_x$, Oxygen, Ammonia) in the after-treatment inlet and outlet, and amount of reductant stored on any catalyst.

The controller 90 may send to the after-treatment system 50 control signals for controlling one or more of: DPF regeneration and SCR fluid injection, and after-treatment maintenance procedures.

The controller 90 may receive from the engine installations 1a-c data signals indicative of, and send to the engine installations 1a-c control signals for controlling one or more of: air flow rate, pressure, temperature, engine speed, oxygen content, crank angle, exhaust gas recirculation status, engine load, etc.

The controller 90 may comprise hardware and/or software. The controller 90 may comprise a control unit or may be a computer program running on a dedicated or shared computing resource. The controller 90 may comprise a single unit or may be composed of a plurality of sub-units that are operatively connected. The controller 90 may be located on one processing resource or may be distributed across spatially separate computing resources. Each engine installation 1a-c may comprise its own sub-controller that is operatively connected to the controller 90. For example, each engine installation 1a-c may comprise an engine electronic control module (ECM) that is operatively connected to a system electronic control module (ECM) of the controller 90.

Figure 7:
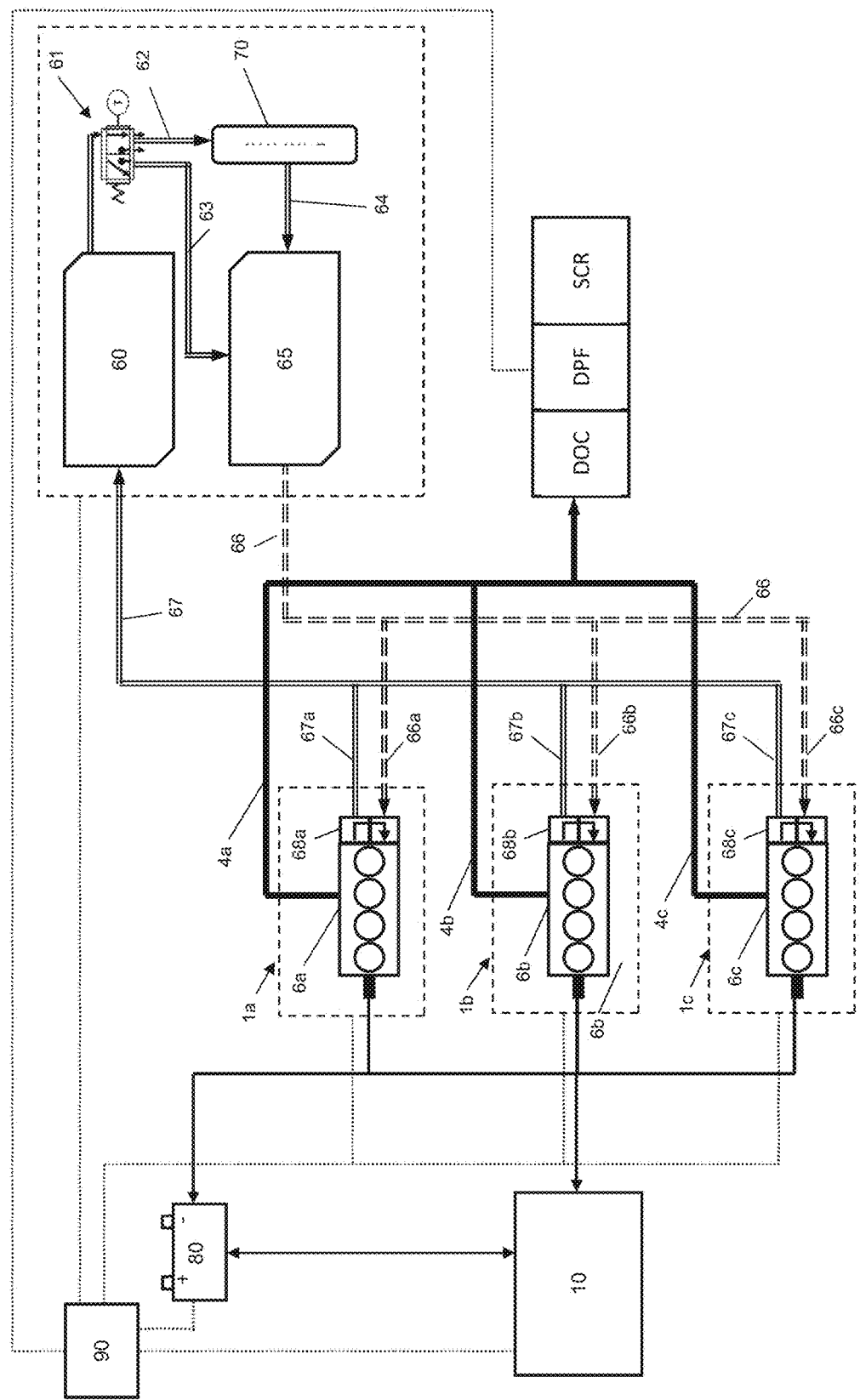
FIG. 7 shows a schematic representation of a second example of a combined engine system according to the present disclosure.

A second example of a combined engine system according to the present disclosure is shown schematically in FIG. 7. Like components to those of the first example have been referenced with like reference numerals. In the following description the differences between the second example and the first example will be discussed. In other respects, unless the context explicitly requires otherwise, details of the second example are as described in the first example.

In the example of FIG. 7, again, three engine installations 1a-c are provided as in the first example. Also, the combined engine system is again provided with an after-treatment system 50 which is connected to the plurality of engines 6a-c to receive exhaust flow from each of the plurality of engines 6a-c. However, the second example differs in the design of its cooling system and in the provision of an energy store connectable to the common load 10.

In this example, the engine installations 1a-c are connected to a common cooling system. The common cooling system may comprise a coolant return reservoir 60, a radiator 70 and a coolant feed reservoir 65. A first feed line 62 may extend between the coolant return reservoir 60 and the radiator 70 and a bypass valve 61 may be located therein which may operate to control flow of a coolant fluid to direct fluid from the coolant return reservoir 60 to either the radiator 70 or directly to the coolant feed reservoir 65 via a bypass line 63. The radiator 70 may feed the coolant fluid to the coolant feed reservoir 65 via a second feed line 64.

Each engine installation 1a-c may be provided with its own coolant pump for pumping coolant fluid from the coolant feed reservoir 65 through the respective engine 6a-c. If required, the common cooling system may comprise a central circulation pump to move the coolant fluid through the common cooling system if a pumping force supplied by the coolant pumps of the engine installations 1a-c is not sufficient.

Coolant fluid may be supplied to each of the engine installations 1a-c via a common coolant feed line 66 which may supply the first engine installation 1a via a first engine installation feed line 66a and which may supply the second engine installation 1b via a second engine installation feed line 66b and which may supply the third engine installation 1c via a third engine installation feed line 66c.

Each engine installation 1a-c may comprise an active thermostat 68a-c which operates to control when coolant fluid from the engine installation feed lines 66a-c is circulated through the respective engine 6a-c.

Coolant fluid may be circulated back from each of the engine installations 1a-c to the coolant return reservoir 60 via a first engine installation return line 67a, a second engine installation return line 67b, and a third engine installation return line 67c, which may each feed a common coolant return line 67 that may connect to the coolant return reservoir 60.

The combined engine system of the second example may also be provided with an energy store 80. The energy store 80 may be electrically connected to the output of the generators of the engine installations 1a-c to receive electrical charge therefrom. The energy store 80 may be electrically connected to the common load 10. The energy store 80 may be configured to supply electrical power to the common load 10. The energy store 80 may also be configured to receive electrical power from the common load 10 to charge the energy store 80. The energy store 80 may be one or more batteries or other energy storage device. Non-limiting examples of other energy storage devices include supercapacitors and electrically coupled flywheels. The energy store 80 may be electrically connected to the common load 10 via a suitable voltage matching device or may provide temporary additional power to the system in some other fashion.

The controller 90 of the second example may function as in the first example. However the controller 90 may also be operatively connected to the common cooling system and the energy store 80. Further, the operative connection to the engine installations 1a-c may also be configured to operate the active thermostats 68a-c.

The controller 90 may receive from the common cooling system data signals indicative of, and send to the common cooling system control signals for controlling one or more of: temperature of the coolant return reservoir 60, temperature of the radiator 70, temperature of the coolant feed reservoir 65, position of the bypass valve 61, central circulation pump speed (where present), and fan speed for the radiator 70.

The controller 90 may receive from the energy store 80 data signals indicative of, and send to the energy store control signals for controlling one or more of: charge level, temperature of the energy store, power inflow level and power outflow level, and voltage.

Figure 8:
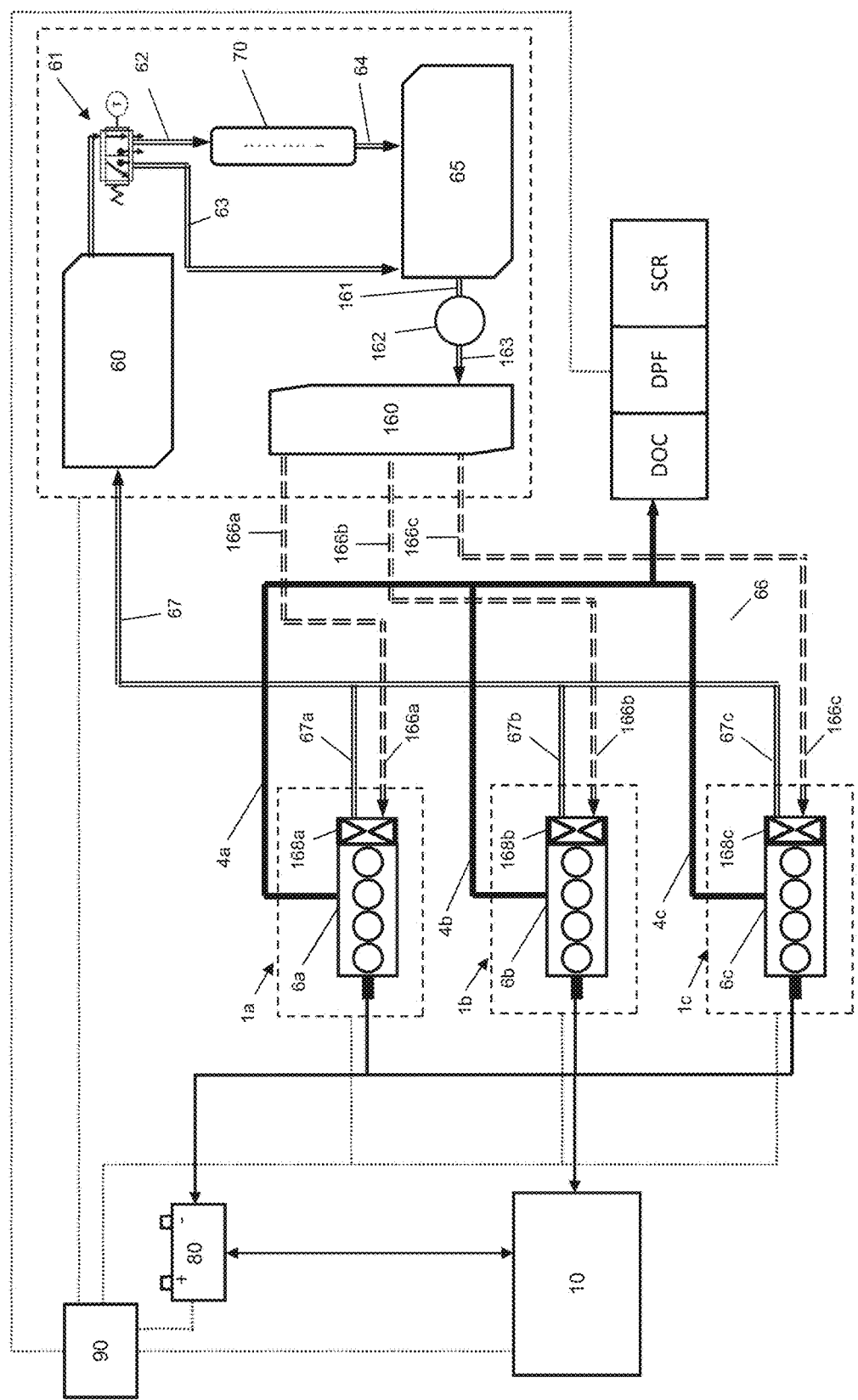
FIG. 8 shows a schematic representation of a third example of a combined engine system according to the present disclosure.

A third example of a combined engine system according to the present disclosure is shown schematically in FIG. 8. Like components to those of the first and second examples have been referenced with like reference numerals. In the following description the differences between the third example and the second example will be discussed. In other respects, unless the context explicitly requires otherwise, details of the third example are as described in the second example.

In the example of FIG. 8, again, three engine installations 1a-c are provided as in the second example. Also, the combined engine system is again provided with an after-treatment system 50 which is connected to the plurality of engines 6a-c to receive exhaust flow from each of the plurality of engines 6a-c. However, the second example differs in the design of the common cooling system.

In this example the common cooling system is additionally provided with a common coolant supply rail 160 that may receive coolant fluid from the coolant feed reservoir 65 via a third feed line 161, a circulation pump 162 and a fourth feed line 163.

Coolant fluid may be supplied to each of the engine installations 1a-c directly from the common coolant supply rail 160. The first engine installation 1a may be fed via a first engine installation feed line 166a. The second engine installation 1b may be fed via a second engine installation feed line 166b. The third engine installation 1c may be fed via a third engine installation feed line 166c.

Each engine installation 1a-c may comprise a coolant valve 168a-c rather than the active thermostats 68a-c of the second example. The coolant valves 168a-c may be configured to open when the respective engine 6a-c is running to circulate coolant fluid therethrough. In addition, the coolant valves 168a-c may be configured to open prior to the respective engine 6a-c starting up to circulate coolant fluid therethrough to pre-heat the respective engine 6a-c.

Coolant fluid may be circulated back from each of the engine installations 1a-c to the coolant return reservoir 60 as described in the second example.

The combined engine system of the third example may also be provided with an energy store 80 as described in the second example.

The controller 90 of the third example may function as in the second example. However the controller 90 may also be operatively connected to coolant valves 168a-c to control their operation.

INDUSTRIAL APPLICABILITY

Figure 1:
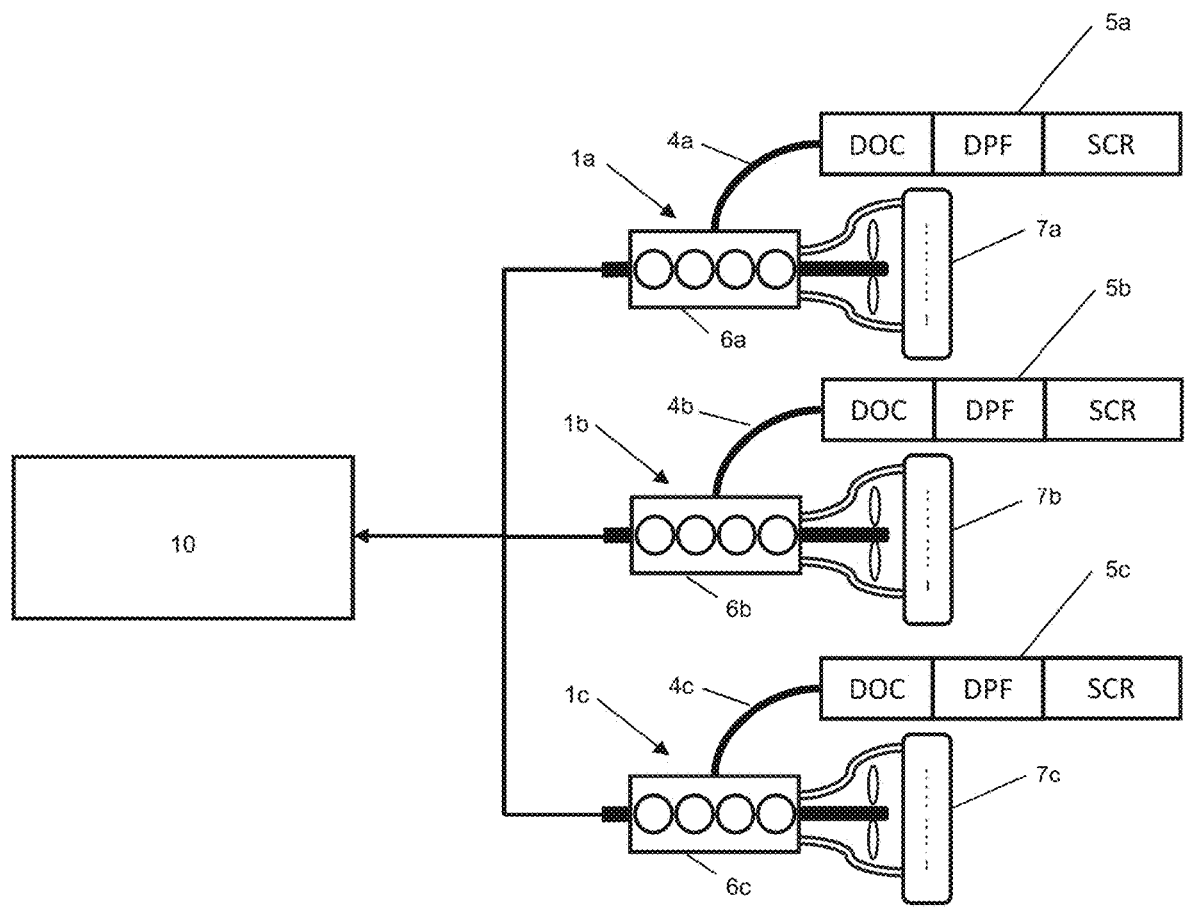
FIG. 1 shows a schematic representation of a prior art combined engine system.
Figure 3:
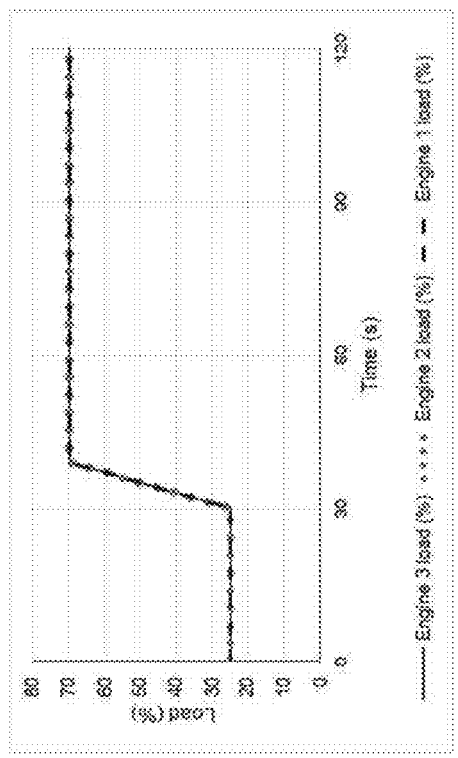
FIG. 3 shows a graph of total load against time for each engine of the prior art combined engine system of FIG. 1.
Figure 4:
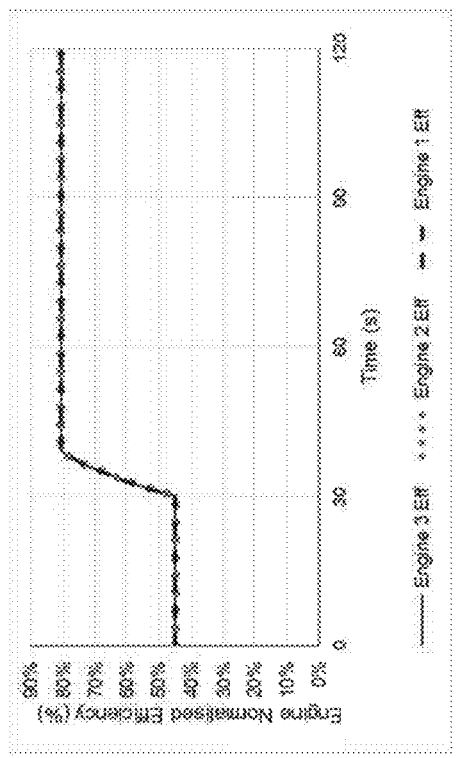
FIG. 4 shows a graph of engine coolant temperature against time for each engine of the prior art combined engine system of FIG. 1.
Figure 2:
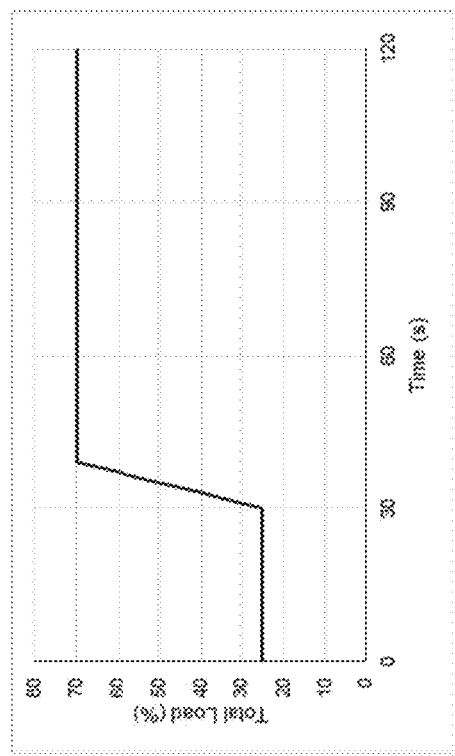
FIG. 2 shows a graph of total load against time for the prior art combined engine system of FIG. 1.

While the prior art combined engine system of FIG. 1 provides a system to meet electrical power demand of a load that can vary in an unpredictable manner, it has a number of disadvantages.

First, when the total load of the combined engine system is low each of the internal combustion engines runs at a relatively low normalised efficiency because the load on each internal combustion engine is also relatively low. Normalised efficiency can be regarded as current engine efficiency divided by best engine efficiency. Engine efficiency may be defined as the net or brake useful work done by the engine divided by the energy of the fuel consumed by the engine in doing that work.

Figure 5:
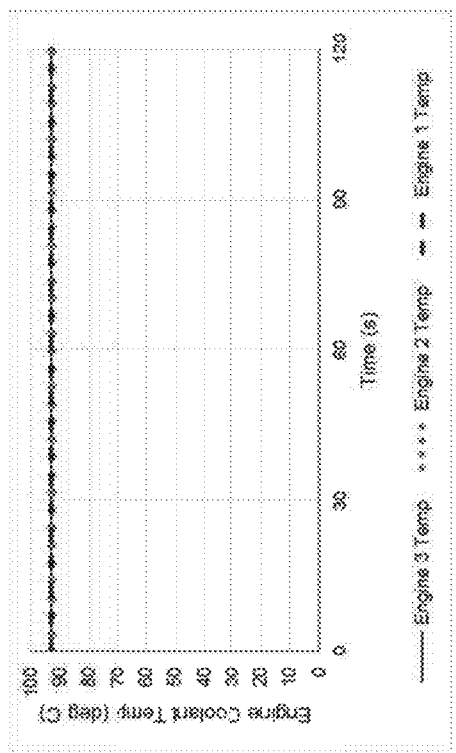
FIG. 5 shows a graph of normalised efficiency against time for each engine of the prior art combined engine system of FIG. 1.

For example, as shown in FIG. 5, from time=0 s to time=30 s the normalised efficiency of each engine is only around 44%. Thus, all of the internal combustion engines run sub-optimally when the total load demanded by the common load 10 is low. In addition, the composite normalised efficiency of the combined engine system at low load is also relatively low at around 44%. This can lead to decreased fuel economy for the combined engine system.

Secondly, when the internal combustion engines are running at a low load they may be unable to provide sufficient heat energy to their respective after-treatment units 5a-c to maintain the after-treatment units 5a-c at an efficient operating temperature. This can lead to an increase in unwanted emissions from the combined engine system or a further efficiency penalty as the engines run in a sub-optimal fashion to artificially increase exhaust temperatures.

The combined engine systems of the present disclosure provide improvements compared to the prior art system of FIG. 1. They may lead to an improvement in fuel economy and may also lead to a reduction in unwanted emissions.

In use, the combined engine systems of the present disclosure are configured to comprise a plurality of engines including at least one primary engine and one or more secondary engines.

The controller 90 is used to operate the combined engine system in a first operating mode to meet a first load demand of the common load 10 and a second operating mode to meet a second load demand of the common load 10 which is greater that the first load demand.

In the first operating mode the controller 90 runs the at least one primary engine (in the examples of FIGS. 6 to 8 that is the first engine 6a) and does not run the one or more secondary engines (in the examples of FIGS. 6 to 8 that is the second engine 6b and the third engine 6c) such that a primary exhaust flow of the at least one primary engine passes through the after-treatment system 50.

In the second operating mode the controller 90 runs at least one of the one or more secondary engines at the same time as the at least one primary engine such that the primary exhaust flow of the at least one primary engine and a secondary exhaust flow of the one or more secondary engines passes through said after-treatment system 50. Advantageously, the after-treatment system 50 may be heated by the exhaust flow of the at least one primary engine prior to the starting of the one or more secondary engines. Consequently, the exhaust flows from the at least one secondary engines may be more efficiently treated by the after-treatment system 50 because said system is already up to temperature and there is therefore no delay in raising the temperature of separate after-treatment units for each engine. They may lead to a reduction in unwanted emissions.

The controller 90 may start up the one or more secondary engines when transitioning from the first operating mode to the second operating mode and may shut down the one or more secondary engines when transitioning from the second operating mode to the first operating mode.

The secondary exhaust flow and the primary exhaust flows may be mixed at or prior to reaching the after-treatment system 50. Each of the plurality of engines 6a-c may be connected to a generator and the generators may be connected to the common load 10.

Operation of the examples of FIGS. 6 to 8 will now be described in more detail. When the power demanded by the common load 10 is low the combined engine system may operate under the action of the controller 90 in the first operating mode such that only the first engine 6a is running.

As noted above, load can be regarded as $$\frac{\text{actual engine output torque}}{\text{maximum engine output torque at current engine speed}}$$

When the power demanded by the common load 10 increases the combined engine system may switch under the action of the controller 90 into the second operating mode such that at least one of the second engine 6b and third engine 6c is started up to provide additional power output to the common load 10.

While the first engine 6a is running, an exhaust flow from the first engine 6a may pass through the first exhaust conduit 4a and the common exhaust conduit and then through the after-treatment system 50.

When the second engine 6b is started up and running an exhaust flow from the second engine 6b may pass through the second exhaust conduit 4b and the common exhaust conduit 40 and then through the after-treatment system 50. Likewise for the third engine 6c. In both cases the after-treatment system 50 may be advantageously already heated to an efficient operating temperature by the exhaust flow from the first engine 6a.

The operational characteristics of the combined engine system of FIGS. 6 to 8 are shown in FIGS. 9 to 12. FIGS. 9 to 12 show idealised data to better illustrate the principals of operation.

Figure 9:
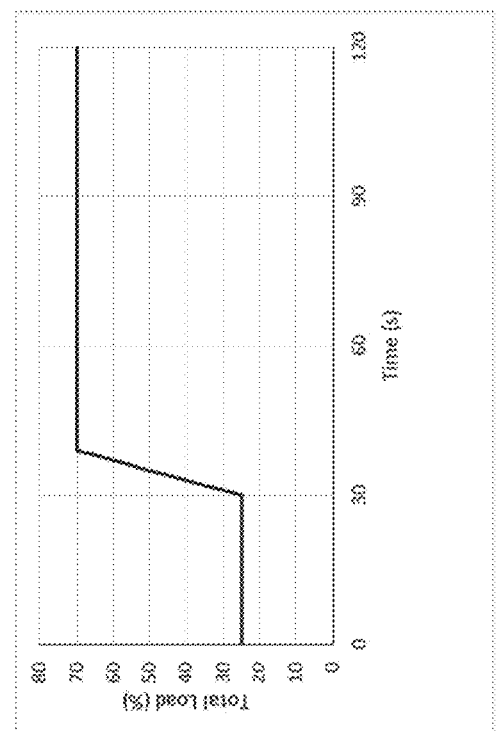
FIG. 9 shows a graph of total load against time for the combined engine systems of FIGS. 6 to 8.

FIG. 9 shows the total load of the combined engine system against time. Initially the total load is at 25%. At time=30 s the total load is increased at an even rate over a 10 s transition period to reach 70% at time=40 s.

Figure 10:
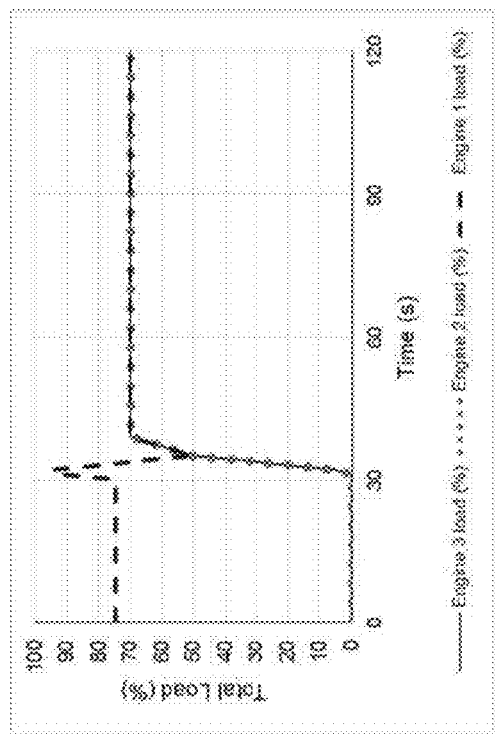
FIG. 10 shows a graph of total load against time for each engine of the combined engine systems of FIGS. 6 to 8.

FIG. 10 shows the load of each of the engines 6a-c against time. Initially the total load of 25% is met by the first engine 6a operating at 75% load. The second engine 6b and the third engine 6c are not running. At time=30 s the second engine 6b and the third engine 6c are started and the load on those engines increases over a 10 s transition period to reach 70% at time=40 s. During the transition period the load on the first engine 6a may increase momentarily as the second engine 6b and third engine 6c run up to speed before the load on the first engine decrease to a steady state at time=40 s of 70%.

To mitigate the increase in the load on the first engine 6a during the transition period, the combined engine system may utilise the energy store 80 under the action of the controller 90 to provide additional power to the common load 10 during the transition period.

Figure 11:
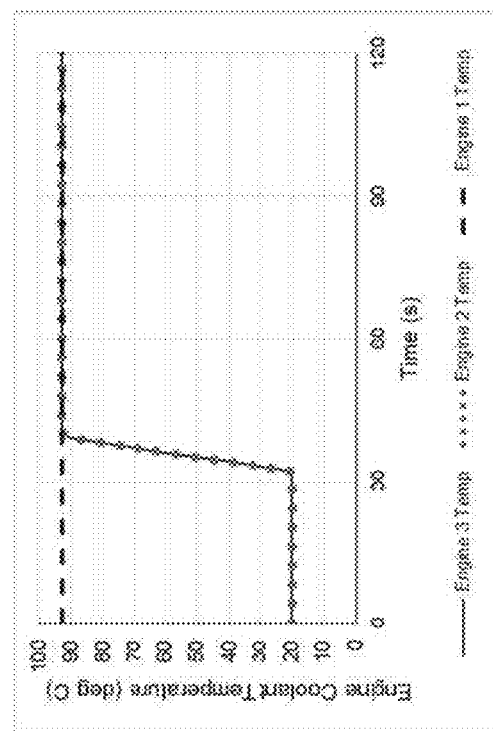
FIG. 11 shows a graph of engine coolant temperature against time for each engine of the combined engine systems of FIGS. 6 to 8.

FIG. 11 shows the engine coolant temperature of each engine 6a-c against time. The first engine 6a is running throughout operation of the combined engine system such that the temperature of the first engine 6a may be maintained at around 93° C. The initial temperature of the second engine 6b and the third engine 6c may be low (e.g. ambient temperature) since those engines are not initially running. Their temperature will rise during start-up to reach a steady-state operating temperature which may be the same as that of the first engine 6a.

In the example of FIG. 6, when each engine 6a-c is running its engine temperature is controlled by its respective cooling system 7a-c.

In the examples of FIGS. 7 and 8, the efficiency of the second engine 6b and the third engine 6c may be increased by use of the common cooling system.

In the common cooling system the coolant fluid, which may be for example, water or oil, may be a common body of fluid that is circulated as required through each of the engines 6a-c. The common cooling system may allow the second engine 6b and the third engine 6c to be pre-warmed prior to start up. For example, in the system of FIG. 7 during initial start up of the combined engine system the coolant fluid circulating between the coolant return reservoir 60 and the coolant feed reservoir 65 may fed only to the first engine 6a by shutting the active thermostats 68b and 68c on the second engine 6b and third engine 6c. The coolant fluid will then be heated by the first engine 6a. Once a suitable temperature of the coolant fluid has been reached the active thermostats 68b and 68c may be opened to circulate the coolant fluid to all three engines even though only the first engine 6a is running. In this way the coolant fluid may pre-warm the second engine 6b and the third engine 6c. A further advantage is that using the coolant fluid to pre-warm the second engine 6b and the third engine 6c may reduce a fan power requirement of the radiator 70 leading to further efficiency gains. Similarly, for the system of FIG. 8 the coolant fluid may be used to pre-warm the second engine 6b and third engine 6c by operation of the valves 168b and 168c to control flow of coolant fluid from the common coolant supply rail 160.

Figure 12:
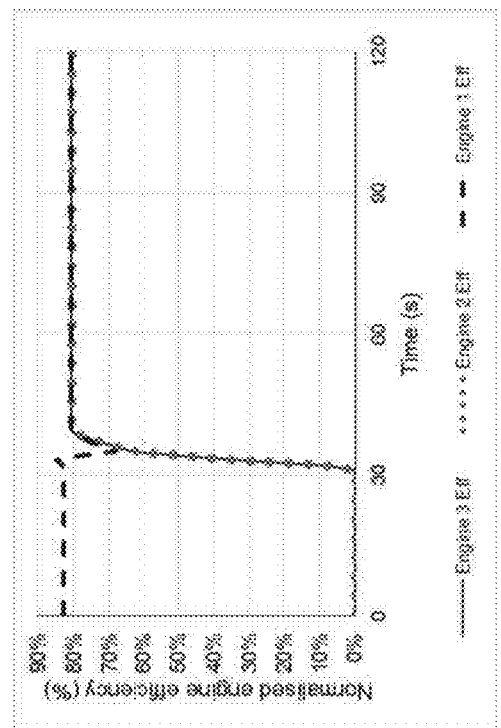
FIG. 12 shows a graph of normalised efficiency against time for each engine of the combined engine systems of FIGS. 6 to 8.

FIG. 12 shows normalised efficiency (as defined above) against time for each engine 6a-c. Initially the first engine 6a has a relatively high normalised efficiency of around 81% because it is operating at a relatively high load of 75%. During the transition period starting at time=30 s the normalised efficiency of the second engine 6b and third engine 6c increase quickly to also reach around 81% by time=40 s. Thus, the composite normalised efficiency of the combined engine system may be maintained at around 81% both before and after the transition period. The composite normalised efficiency will dip during the transition period as the secondary engines are started. However, as noted above, this effect can be mitigated by pre-warming the at least one secondary engines using the coolant fluid that has been heated by the at least one primary engines.

Figure 13:
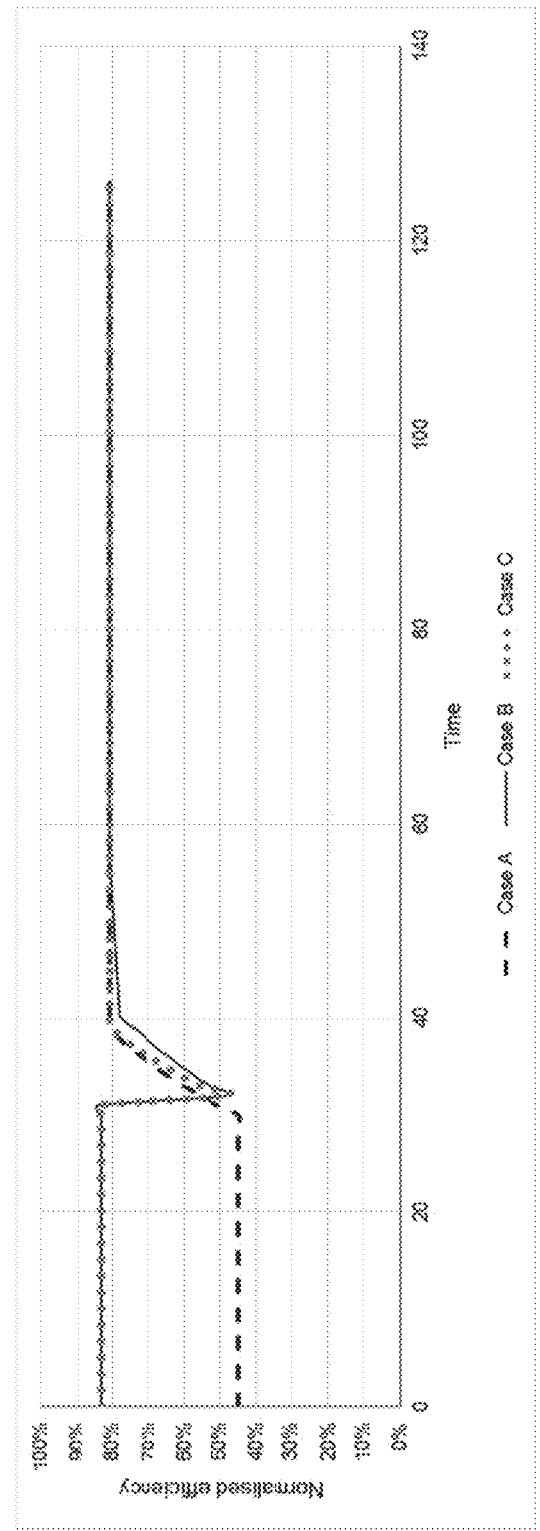
FIG. 13 shows a graph comparing the normalised efficiency of the prior art combined engine system of FIG. 1 with the combined engine systems of FIGS. 6 to 8.
Figure 14:
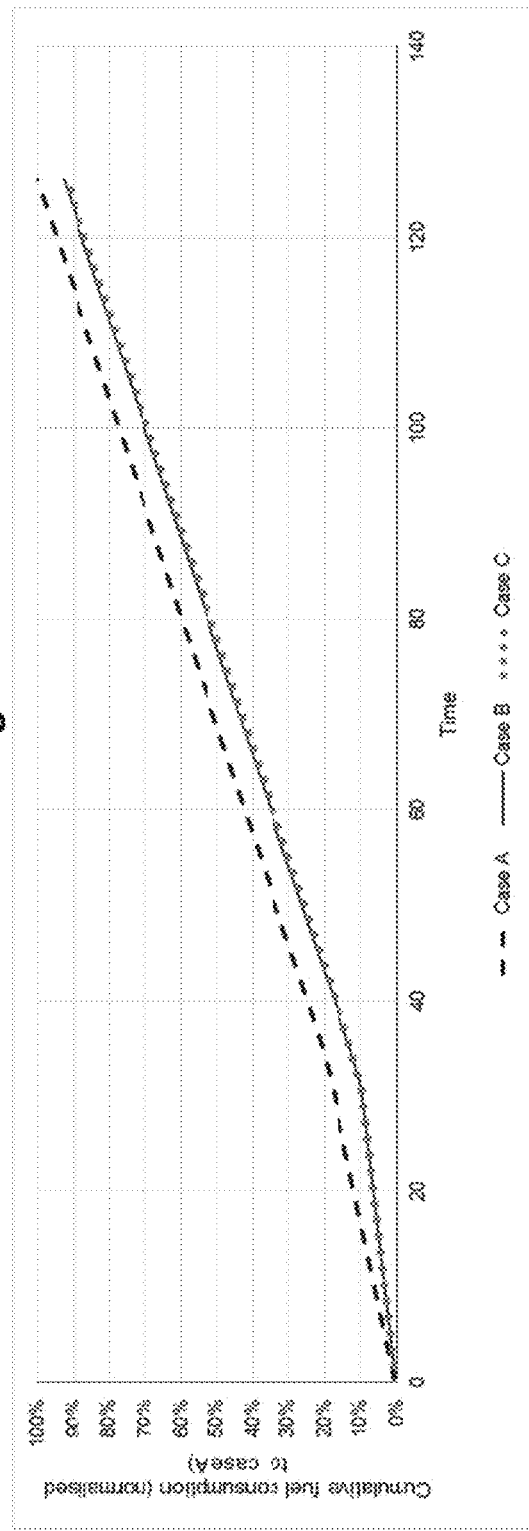
FIG. 14 is a graph comparing the cumulative fuel consumption of the prior art combined engine system of FIG. 1 with the combined engine systems of FIGS. 6 to 8.

The combined engine systems of the present disclosure may lead to an improvement in fuel economy as shown in FIGS. 13 and 14. FIG. 13 illustrates normalised efficiency against time for Cases A, B and C. Case A is the prior art system of FIG. 1. Case B is the combined engine systems of FIGS. 7 and 8 with no pre-warming of the second engine 6b and the third engine 6c. Case C is the combined engine systems of FIGS. 7 and 8 with pre-warming of the second engine 6b and the third engine 6c.

Case B has been found to produce a 7.2% reduction in fuel consumption compared to Case A for the illustrated use profile of FIG. 13 which contains a single transition from the first operating more to the second operating mode. Case C has been found to generate a further 0.7% reduction in fuel consumption compared to Case B, i.e. a total reduction in fuel consumption of 7.9%. It will be appreciated that the fuel consumption gains will vary with the actual use profile of the combined engine system, e.g. the number of changes in operating mode, the time spent running in the first operating mode, etc.

It will be appreciated by the reader that features of each of the examples of the present disclosure may be combined with each other as desired unless the context explicitly dictates otherwise and such combinations are to be considered as included in the present disclosure. For example, the energy store 80 of FIG. 7 may be used with the combined engine system of FIG. 6.

Further, the common cooling system of the present disclosure may be used as part of a combined engine system which may or may not also comprise the common after-treatment system of the present disclosure.

Other modifications will be apparent to the reader. For example, while the present disclosure has been illustrated using a combined engine system comprising three engines the combined engine system may comprises two, three or more than three engines.

What is claimed is:

1. A combined engine system comprising:
   a plurality of engines including at least one primary engine and one or more secondary engines;
   a plurality of generators configured to generate electrical power, wherein each of the plurality of generators is connected to a one of the plurality of engines, and wherein an output from each of the plurality of generators is electrically connected to a common load;
   an after-treatment system connected to the plurality of engines to receive exhaust flow from each of the plurality of engines;
   a common cooling system connected to the plurality of engines, the common cooling system comprising a common body of coolant fluid, a common coolant rail, a radiator and a plurality of valves or active thermostats;
   a plurality of valves or active thermostats for controlling circulation of the coolant fluid from the common coolant supply rail to the at least one primary engine and the one or more secondary engines;
   a controller, wherein:
      the controller is configured to operate the combined engine system in a first operating mode to meet a first load demand of the common load and a second operating mode to meet a second load demand of the common load which is greater than the first load demand;
      in the first operating mode the controller is configured to run the at least one primary engine and not run the one or more secondary engines such that a primary exhaust flow of the at least one primary engine passes through the after-treatment system;
      in the second operating mode the controller is configured to run at least one of the one or more secondary engines at the same time as the at least one primary engine such that the primary exhaust flow of the at least one primary engine and a secondary exhaust flow of the one or more secondary engines passes through said after-treatment system.

2. A combined engine system as claimed in claim 1, wherein the controller is configured to start up the one or more secondary engines when transitioning from the first operating mode to the second operating mode and shut down the one or more secondary engines when transitioning from the second operating mode to the first operating mode.

3. A combined engine system as claimed in claim 1, wherein the secondary exhaust flow and the primary exhaust flows are mixed at or prior to reaching the after-treatment system.

4. A combined engine system as claimed in claim 1, further comprising an energy store connectable to the common load; wherein the energy store is configured to provide load capacity during start up of the one or more secondary engines.

5. A combined engine system as claimed in claim 1, wherein the plurality of valves or active thermostats are configured to circulate the coolant fluid through the at least one primary engine when the at least one primary engine is running and to circulate the coolant fluid through the at least one primary engine and the one or more secondary engines when the at least one primary engine and the one or more secondary engines are running.

6. A combined engine system as claimed in claim 1, wherein the plurality of valves or active thermostats are configured to circulate the coolant fluid through at least one of the one or more secondary engines while in the first operating mode, prior to starting the at least one of the one or more secondary engine, to preheat the at least one of the one or more secondary engines.

7. A combined engine system as claimed in claim 1, wherein the controller is configured to control the plurality of valves or active thermostats.

8. A method of operating a combined engine system of the type comprising a plurality of engines including at least one primary engine and one or more secondary engines, the method comprising the steps of:
connecting an output from each of the plurality of engines to a one of a plurality of generators for generating electrical power;
providing the electrical power generated by each of the plurality of generators to a common load;
connecting an exhaust outlet of each of the plurality of engines to an after-treatment system;
connecting a common cooling system to the plurality of engines, the common cooling system comprising a common body of coolant fluid, a common coolant rail, a radiator and a plurality of valves or active thermostats;
operating the plurality of valves or active thermostats to control circulation of the coolant fluid to the at least one primary engine and the one or more secondary engines;
using a controller to operate the combined engine system in a first operating mode to meet a first load demand of the common load and a second operating mode to meet a second load demand of the common load which is greater than the first load demand, wherein;
in the first operating mode the controller runs the at least one primary engine and does not run the one or more secondary engines such that a primary exhaust flow of the at least one primary engine passes through the after-treatment system;
in the second operating mode the controller runs at least one of the one or more secondary engines at the same time as the at least one primary engine such that the primary exhaust flow of the at least one primary engine and a secondary exhaust flow of the one or more secondary engines passes through said after-treatment system.

9. The method of claim 8, wherein the controller starts up the one or more secondary engines when transitioning from the first operating mode to the second operating mode and shuts down the one or more secondary engines when transitioning from the second operating mode to the first operating mode.

10. The method of claim 8, wherein the secondary exhaust flow and the primary exhaust flows are mixed at or prior to reaching the after-treatment system.

11. The method of claim 8, further comprising the step of storing energy in an energy store which is connected to the common load and configuring the energy store to provide load capacity during start up of the one or more secondary engines.

12. The method of claim 8, further comprising:
circulating the coolant fluid through the at least one primary engine when the at least one primary engine is running and through the at least one primary engine and the one or more secondary engines when the at least one primary engine and the one or more secondary engines are running.

13. The method of claim 8, further comprising:
circulating the coolant fluid through at least one of the one or more secondary engines while in the first operating mode, prior to starting the at least one of the one or more secondary engines to preheat the at least one of the one or more secondary engines.

14. The method of claim 8, further comprising:
using the controller to control the plurality of valves or active thermostats.

15. The method of claim 13, wherein the coolant fluid is circulated through the at least one of the one or more secondary engines once the coolant fluid has reached a suitable temperature.

16. The method of claim 8, wherein the controller is configured to control at least one of: temperature of a coolant return reservoir, temperature of a coolant system radiator, temperature of a coolant feed reservoir, circulation speed of the coolant fluid and a fan speed for a fan configured to cool the coolant system radiator.

* * * * *